US011788677B2

(12) United States Patent
Li et al.

(10) Patent No.: US 11,788,677 B2
(45) Date of Patent: Oct. 17, 2023

(54) HANGER AND DISPLAY DEVICE

(71) Applicants: Optoma Corporation, New Taipei (TW); Lighthouse Technologies Ltd., Shatin (HK)

(72) Inventors: Chia Yu Li, Hsin-Chu (TW); Justin Nicholas Halls, Hsin-Chu (TW); Tin Po Chu, Hsin-Chu (TW)

(73) Assignees: Optoma Corporation, New Taipei (TW); Lighthouse Technologies Ltd., Shatin (HK)

( * ) Notice: Subject to any disclaimer, the term of this patent is extended or adjusted under 35 U.S.C. 154(b) by 415 days.

(21) Appl. No.: 17/103,951

(22) Filed: Nov. 25, 2020

(65) Prior Publication Data
US 2021/0156510 A1 May 27, 2021

(30) Foreign Application Priority Data
Nov. 26, 2019 (CN) .......................... 201911170924.5

(51) Int. Cl.
*F16M 13/02* (2006.01)
*F16M 13/00* (2006.01)
(Continued)

(52) U.S. Cl.
CPC ............ *F16M 13/02* (2013.01); *F16M 11/04* (2013.01); *F16M 11/20* (2013.01); *F16M 13/005* (2013.01); *G09F 9/3026* (2013.01)

(58) Field of Classification Search
CPC ...... F16M 11/04; F16M 11/20; F16M 13/005; F16M 13/02; H04N 5/645; G09F 19/02; G09F 9/3026
See application file for complete search history.

(56) References Cited

U.S. PATENT DOCUMENTS 10,832,603 B2 * 11/2020 Chapuis ............. G06Q 30/0623
2010/0321917 A1 12/2010 Kim et al.
2013/0306816 A1 11/2013 Yoshida

FOREIGN PATENT DOCUMENTS

CN 101937630 1/2011
CN 201795252 4/2011
(Continued)

OTHER PUBLICATIONS

"Office Action of China Counterpart Application", dated Sep. 28, 2022, p. 1-p. 14.
(Continued)

*Primary Examiner* — Wing H Chow
(74) *Attorney, Agent, or Firm* — JCIPRNET

(57) ABSTRACT

A hanger hanging multiple display modules is provided. Each display module has at least one rolling receiving portion. The hanger includes a hanger base and a first hanging structure disposed on the hanger base and including at least one first hanging slot corresponding to the rolling receiving portion of the display module. A rolling receiving portion of a first display module passes through the first hanging slot to hang the first display module on the first hanging structure. The first hanging slot includes a first guide section extending along a first direction and a second guide section extending along a second direction. The second guide section is connected to the first guide section. The rolling receiving portion reaches a first position by guidance of the first guide section and a second position by guidance of the second guide section. A display device using the hanger is further provided.

22 Claims, 18 Drawing Sheets

(51) Int. Cl.
*G09F 9/302* (2006.01)
*F16M 11/04* (2006.01)
*F16M 11/20* (2006.01)

(56) References Cited

FOREIGN PATENT DOCUMENTS

| | | |
|---|---|---|
| CN | 103174275 | 6/2013 |
| CN | 203068088 | 7/2013 |
| CN | 103646622 | 3/2014 |
| CN | 204005126 | 12/2014 |
| CN | 205510933 | 8/2016 |
| CN | 205745958 | 11/2016 |
| CN | 208625442 | 3/2019 |
| CN | 209297671 | 8/2019 |
| KR | 101043987 | 6/2011 |
| KR | 20110072335 | 6/2011 |
| TW | M318307 | 9/2007 |
| TW | M493847 | 1/2015 |
| WO | 2010126235 | 11/2010 |

OTHER PUBLICATIONS

"Office Action of Taiwan Counterpart Application", dated Jan. 8, 2021, p. 1-p. 9.
"Office Action of China Counterpart Application", dated Mar. 22, 2022, p. 1-p. 15.

\* cited by examiner

HANGER AND DISPLAY DEVICE

CROSS-REFERENCE TO RELATED APPLICATION

This application claims the priority benefit of China application serial no. 201911170924.5, filed on Nov. 26, 2019. The entirety of the above-mentioned patent application is hereby incorporated by reference herein and made a part of this specification.

BACKGROUND OF THE INVENTION

1. Field of the Invention

The invention relates to a hanger and a display device, and in particular, to a hanger with a hanging slot and a display device with a rolling receiving portion.

2. Description of Related Art

With the advancement of display technologies, large-scale display devices may be applied outdoors in various public places. During assembly of a large-scale display device, a plurality of cabinets need to be mounted to a hanger base in sequence and fixed together. Then a plurality of display panels may be disposed on the cabinets to assemble a large display screen. The cabinet may be made of large-sized sheet metal. However, each piece of sheet metal is difficult to assemble and position due to a large weight thereof.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY OF THE INVENTION

The invention provides a hanger and a display device. Each display module of the display device is preferably easily assembled and positioned using the hanger.

Other objectives and advantages of the invention may be further understood from the technical features disclosed in the invention.

In order to achieve one or a part or all of the foregoing objectives or other objectives, embodiments of the invention provide a hanger configured to hang a plurality of display modules. Each of the display modules includes at least one rolling receiving portion. The hanger includes a hanger base and a first hanging structure disposed on the hanger base. The first hanging structure includes at least one first hanging slot. The first hanging slot corresponds to a rolling receiving portion of the display module. In this way, a rolling receiving portion of a first display module passes through the first hanging slot, and the first display module is hung on the first hanging structure. The first hanging slot includes a first guide section extending along a first direction and a second guide section extending along a second direction, the second guide section being connected to the first guide section. The rolling receiving portion of the first display module reaches a first position by guidance of the first guide section, and reaches a second position by guidance of the second guide section.

In order to achieve one or a part or all of the foregoing objectives or other objectives, embodiments of the invention provide display device including a plurality of display modules and a hanger. Each of the display modules includes at least one rolling receiving portion. The hanger includes a hanger base and a first hanging structure disposed on the hanger base. The first hanging structure includes at least one first hanging slot, and the first hanging slot corresponds to the at least one rolling receiving portion of the display module, so that the rolling receiving portion of the first display module passes through the first hanging slot, and the first display module is hung on the first hanging structure. The first hanging slot includes a first guide section extending along a first direction and a second guide section extending along a second direction, the second guide section being connected to the first guide section. The rolling receiving portion of the first display module reaches a first position by guidance of the first guide section, and reaches a second position by guidance of the second guide section.

Based on the above, the embodiments of the invention have at least one of the following advantages or effects. The first hanging structure of the hanger has a first hanging slot for the rolling receiving portion of the display module to pass through, and the first hanging slot includes the first guide section and the second guide section respectively extending along different directions. The rolling receiving portion of the display module may reach the first position by guidance of the first guide section, so that a cabinet of the display module is positioned at a predetermined mounting position in the first direction, and then the rolling receiving portion of the display module may reach the second position by guidance of the second guide section, so that the cabinet of the display module is moved to a predetermined mounting position in the second direction to complete mounting of the display module. In such a configuration, by guidance of the first guide section and the second guide section of the first hanging slot to the rolling receiving portion of the display module, the cabinet of the display module can be smoothly and easily moved to a correct position, thereby effectively reducing difficulty in assembling and positioning the display module.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
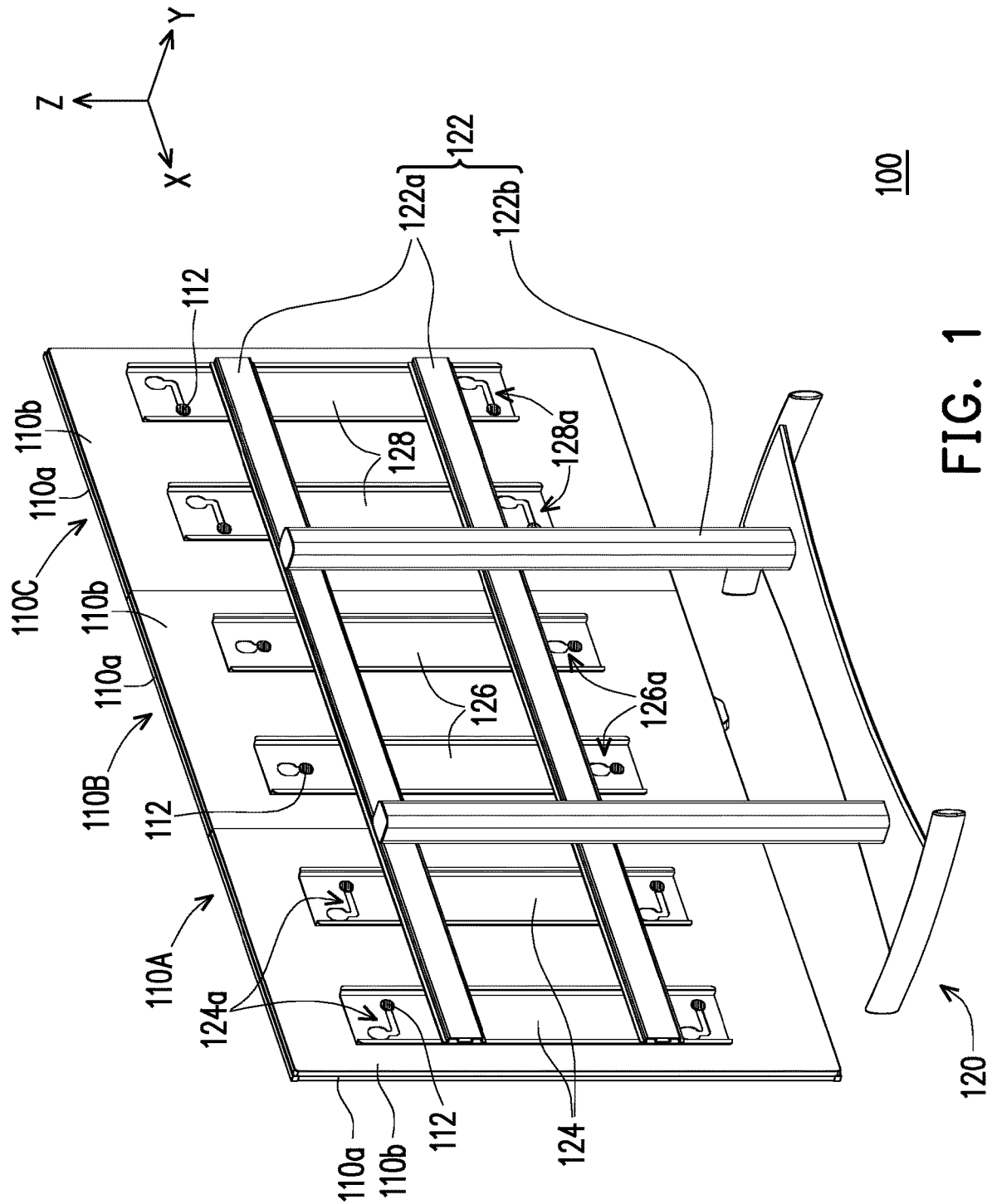
FIG. 1 is a schematic perspective diagram of a display device according to an embodiment of the invention.
Figure 2:
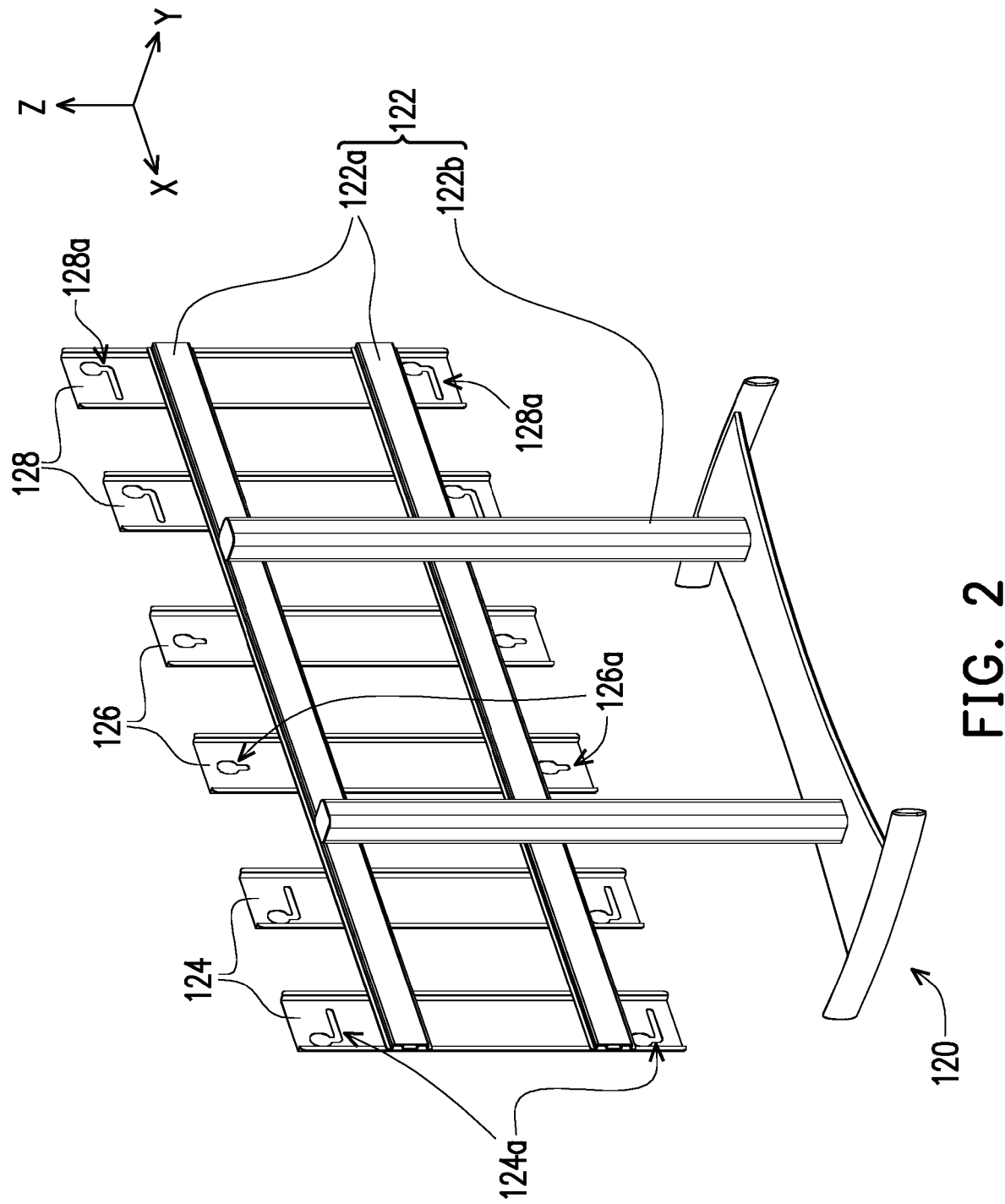
FIG. 2 is a schematic perspective diagram of a hanger in FIG. 1.
Figure 3:
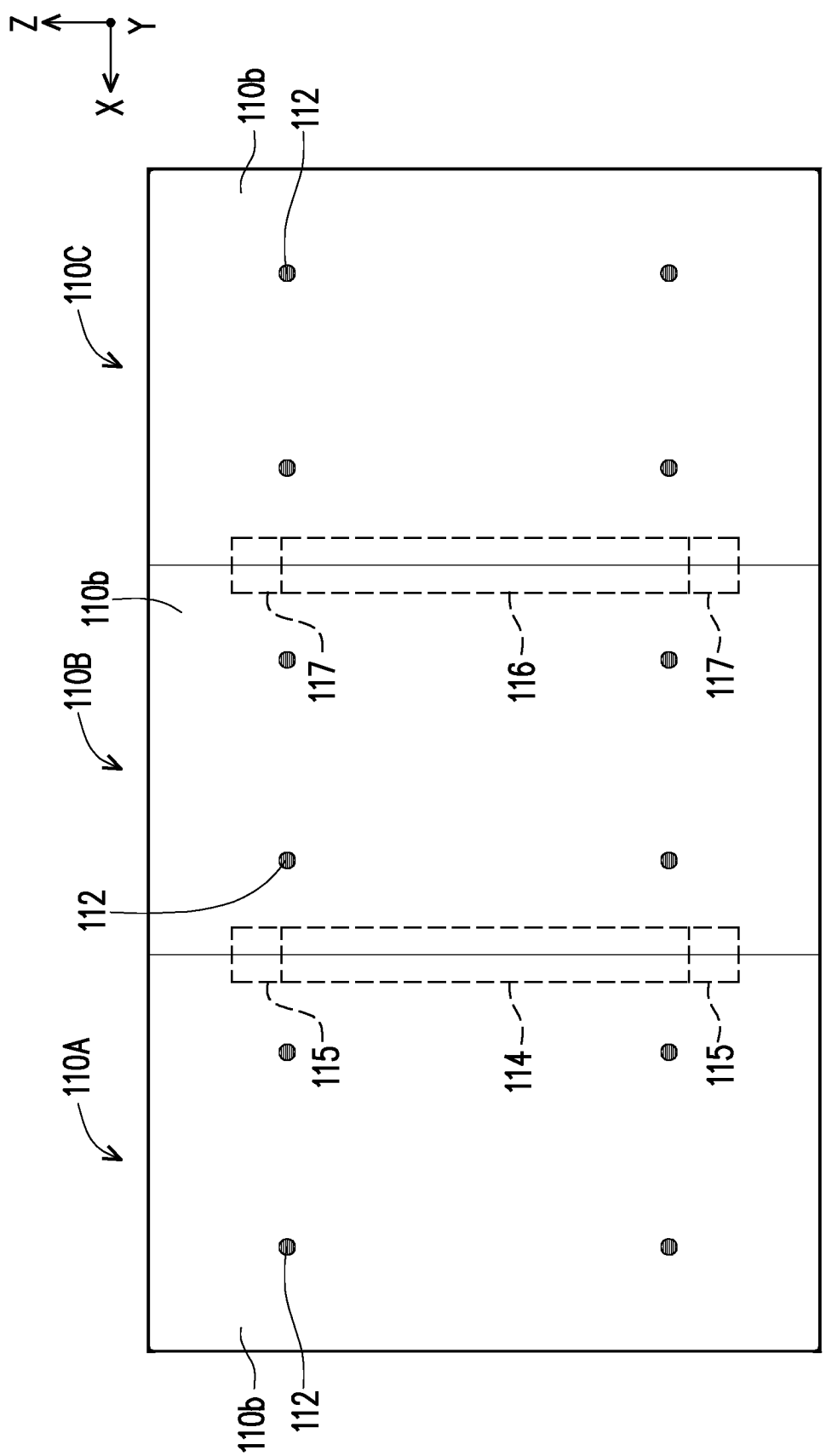
FIG. 3 is a schematic rear diagram of the display module in FIG. 1.

FIG. 1 is a schematic perspective diagram of a display device according to an embodiment of the invention. FIG. 2 is a schematic perspective diagram of a hanger in FIG. 1. FIG. 3 is a schematic rear diagram of the display module in FIG. 1. Referring to FIG. 1 to FIG. 3, a display device 100 in the present embodiment includes a hanger 120 and a plurality of display modules 110 (for example, a first display module 110A, a second display module 110B, and a third display module 110C). As shown in FIG. 1, each of the display modules 110A, 110B, and 110C may include at least one rolling receiving portion 112. For example, the display module 110A may include four bodies evenly distributed at a back surface.

In the present embodiment, the hanger 120 includes a hanger base 122, a first hanging structure 124, a second hanging structure 126, and a third hanging structure 128. For example, as shown in FIG. 1, the first hanging structure 124 may be configured as a set of two plates, the second hanging structure 126 may be configured as a set of two plates, and/or the third hanging structure 128 may be configured as a set of two plates. The first hanging structure 124, the second hanging structure 126, and the third hanging structure 128 may be disposed on the hanger base 122. In some embodiments, the first hanging structure 124, the second hanging structure 126, and the third hanging structure 128 may extend along a first direction Z. The first hanging structure 124, the second hanging structure 126, and the third hanging structure 128 may be arranged at intervals in parallel. For example, the hanging structures 124, 126, and 128 are arranged at intervals in parallel in a second direction X perpendicular to the first direction Z. In other embodiments, the number of the hanging structures 124, 126, and/or 128 is not limited thereto, and may be increased or reduced according to actual installation requirements. No limitation is imposed on this in the invention.

In the present embodiment, the hanger base 122 includes a first bracket 122a and a second bracket 122b. The first bracket 122a is configured to connect the first hanging structure 124, the second hanging structure 126, and the third hanging structure 128. The second bracket 122b is connected to the first bracket 122a and may be disposed on the ground. In embodiments shown in FIG. 1 to FIG. 3, the first bracket 122a is a lateral bracket extending along the second direction X, and the second bracket 122b is a longitudinal bracket extending along the first direction Z. However, no limitation is imposed on this in the invention. In other embodiments, the hanger base 122 may not include the second bracket 122b. In this case, the first bracket 122a may be mounted on a wall.

In the present embodiment, each of the display modules 110A, 110B, and 110C includes a display panel 110a and a cabinet 110b. The rolling receiving portion 112 may be formed on one side of the cabinet 110b. For example, the display panel 110a is disposed on a front side of the cabinet 110b, and the rolling receiving portion 112 is formed on a rear side of the cabinet 110b. The cabinet 110b is provided with a signal transmission line group corresponding to the display panel 110a, such as a signal transmitter, a signal receiver, a hub, and a power supply unit (PSU), etc. In other embodiments, each display module may have other suitable sizes or shapes, or each display module may include different numbers of display panels and cabinets. For example, a display module may include a display panel and a plurality of cabinets. The plurality of cabinets correspond to the display panel. No limitation is imposed on this in the invention. In the present embodiment, the display panel 110a may include a light source apparatus such as an LED.

As shown in FIG. 1 and FIG. 2, in the invention, each of the first hanging structures 124 has at least one first hanging slot 124a (an upper one and a lower one are shown), each of the second hanging structures 126 has at least one second hanging slot 126a (an upper one and a lower one are shown), and each of the third hanging structures 128 has at least one third hanging slot 128a (an upper one and a lower one are shown). The first hanging slots 124a, the second hanging slots 126a, and the third hanging slots 128a are respectively linearly arranged at intervals along the first direction Z in each of the first hanging structures 124, each of the second hanging structures 126, and each of the third hanging structures 128. In other embodiments, each of the first hanging structures 124 may include other appropriate numbers of first hanging slots 124a, each of the second hanging structures 126 may include other appropriate numbers of second hanging slots 126a, and/or each of the third hanging structures 128 may include other appropriate numbers of third hanging slots 128a. For example, each of the first hanging structures 124 includes one first hanging slot 124a at a middle position of the first hanging structure 124. No limitation is imposed on this in the invention.

In the present embodiment, for example, a number and a position of the first hanging slot 124a of the first hanging structure 124, a number and a position of the second hanging slot 126a of the second hanging structure 126, and a number and a position of the third hanging slot 128a of the third hanging structure 128 may respectively correspond to numbers and positions of respective rolling receiving portions 112 of the first display module 110A, the second display module 110B, and the third display module 110C. In particular, each of the rolling receiving portions 112 of the first display module 110A may respectively pass through each of the first hanging slots 124a of the first hanging structure 124, so that the first display module 110A can be hung on the first hanging structure 124. Each of the rolling receiving portions 112 of the second display module 110B may pass through each of the second hanging slots 126a of the second hanging structure 126, so that the second display module 110B can be hung on the second hanging structure 126. Each of the rolling receiving portions 112 of the third display module 110C may pass through each of the third hanging slots 128a of the third hanging structure 128, so that the third display module 110C can be hung on the third hanging structure 128. However, the invention is not limited thereto.

Figure 4:
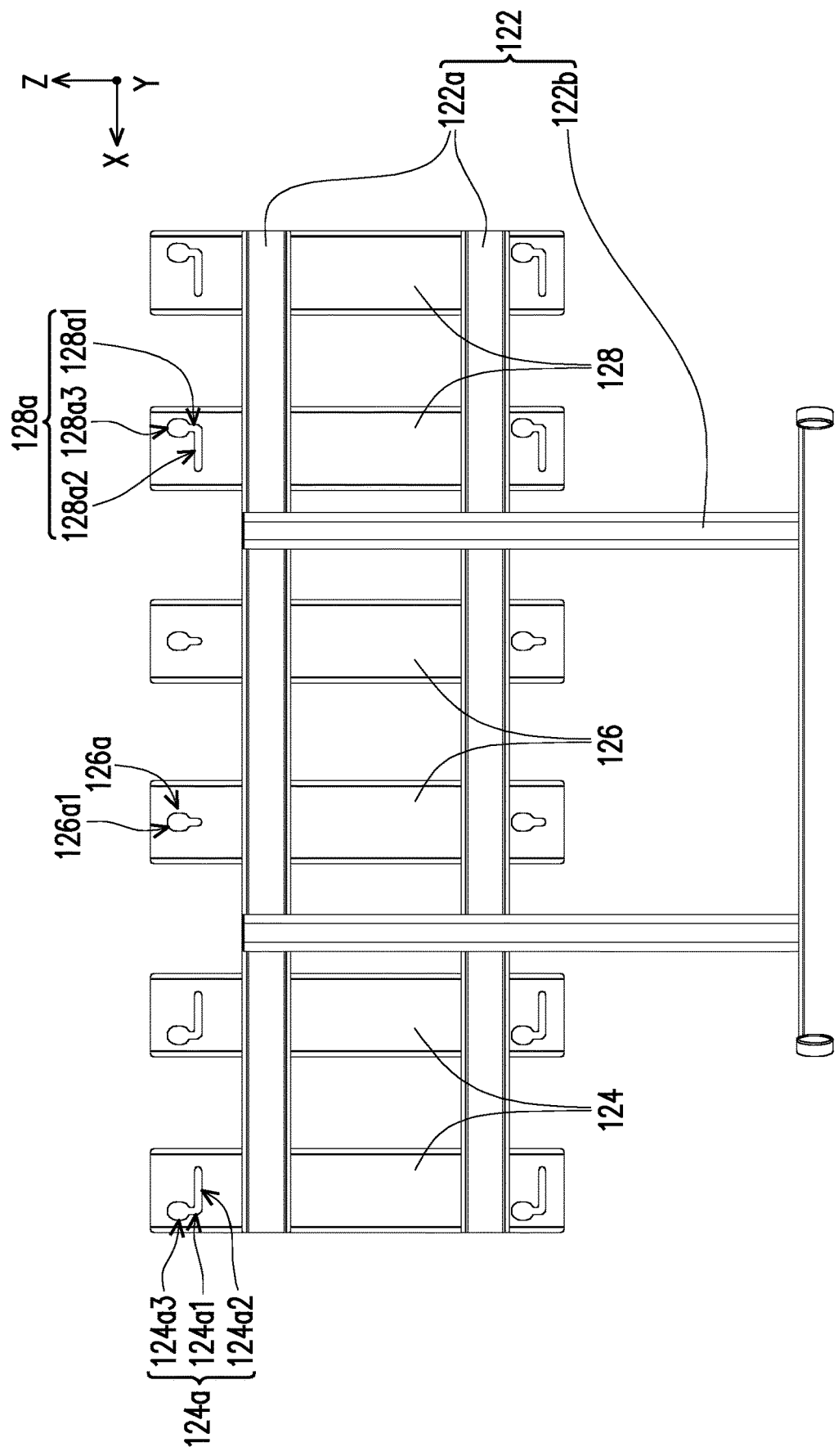
FIG. 4 is a schematic rear diagram of the hanger in FIG. 1.

FIG. 4 is a schematic rear diagram of the hanger in FIG. 1. As shown in FIG. 4, the first hanging slot 124a includes a first guide section 124a1 extending along the first direction Z, a second guide section 124a2 extending along the second direction X, and a first perforation 124a3. The first perforation 124a3 is located at one end of the first guide section 124a1. A diameter of the first perforation 124a3 is greater than a width of the first guide section 124a1 and a diameter of the rolling receiving portion 112. The second guide section 124a2 is connected to the other end of the first guide section 124a1. In some embodiments, the second guide section 124a2 has a length greater than a length of the first guide section 124a1. As shown in FIG. 4, the first hanging slot 124a may be roughly L-shaped, but the invention is not limited thereto. In some embodiments, as shown in FIG. 4, the second hanging slot 126a extends along the first direction Z and includes a second perforation 126a1. The second perforation 126a1 is located at one end of the second hanging slot 126a. A diameter of the second perforation 126a1 is greater than a width of the second hanging slot 126a and a diameter of the rolling receiving portion 112. As shown in FIG. 4, the second hanging slot 126a may be roughly I-shaped, but the invention is not limited thereto. In some embodiments, as shown in FIG. 4, the third hanging slot 128 includes a third guide section 128a1 extending along the first direction Z, a fourth guide section 128a2 extending along the second direction X, and a third perforation 128a3. The third perforation 128a3 is located at one end of the third guide section 128a1. A diameter of the third perforation 128a3 is greater than a width of the third guide section 128a1 and a diameter of the rolling receiving portion 112. The fourth guide section 128a2 is connected to the other end of the third guide section 128a1. In some embodiments, the fourth guide section 128a2 has a length greater than a length of the third guide section 128a1. As shown in FIG. 4, the third hanging slot 128 may have a roughly inverse L-shape relative to the first hanging slot 124a, but the invention is not limited thereto. In the foregoing embodiments, designing of the first hanging slot 124a, the second hanging slot 126a, and the third hanging slot 128a may guide mounting of the display modules 110A, 110B and 110C, which is described in detail below with reference to the drawing.

Figure 5A:
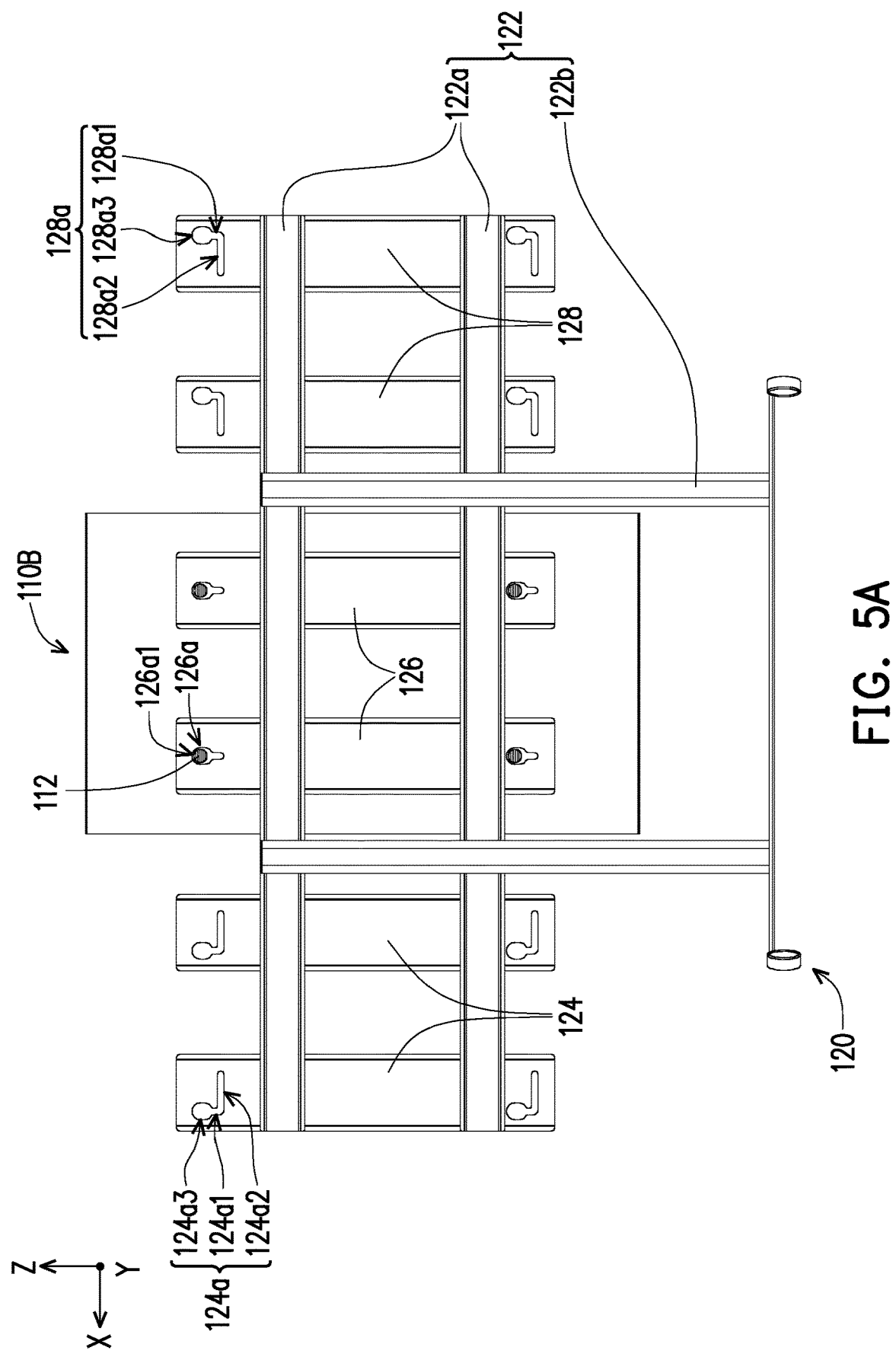
FIG. 5A to FIG. 5H illustrate a schematic assembly process of the display device in FIG. 1.
Figure 5B:
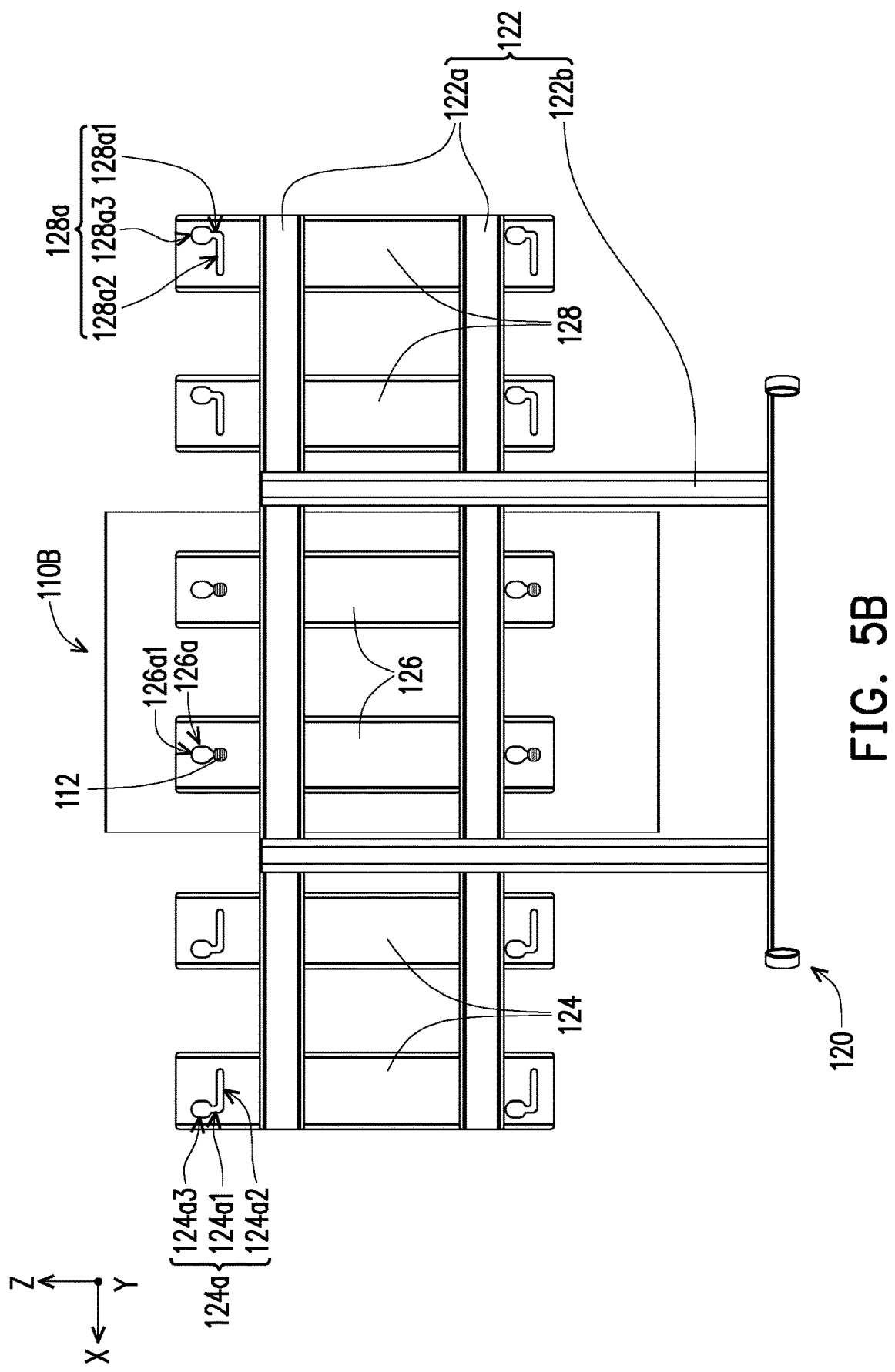

FIG. 5A to FIG. 5H illustrate a schematic assembly process of the display device in FIG. 1. As shown in FIG. 5A, the rolling receiving portion 112 of the second display module 110B may enter the second hanging slot 126a through the second perforation 126a1 along the third direction Y, so that the rolling receiving portion 112 of the second display module 110B may reach a position shown in FIG. 5B by guidance of the second hanging slot 126a, thereby mounting the second display module 110B in place.

Figure 5C:
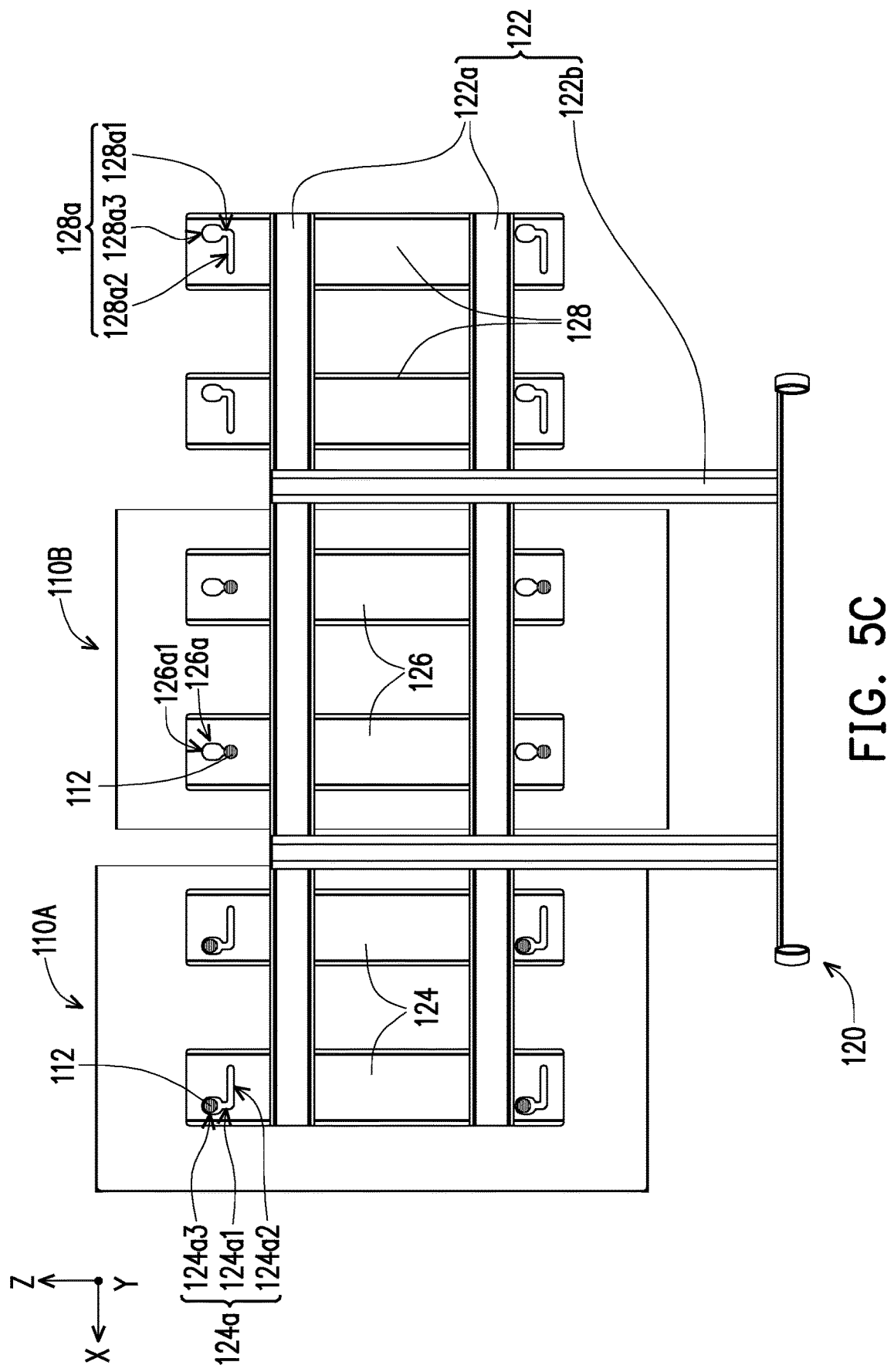
Figure 5D:
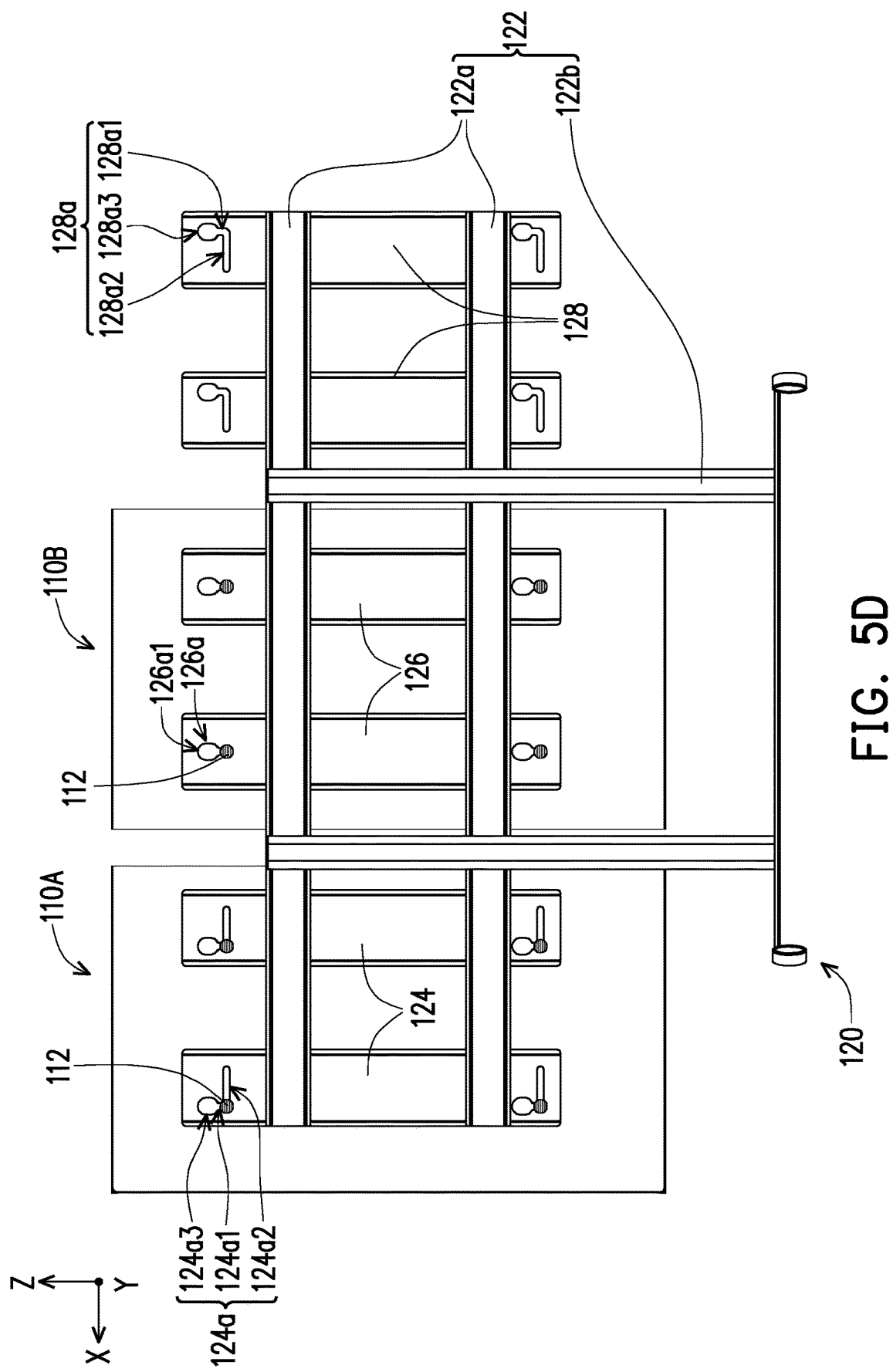
Figure 5E:
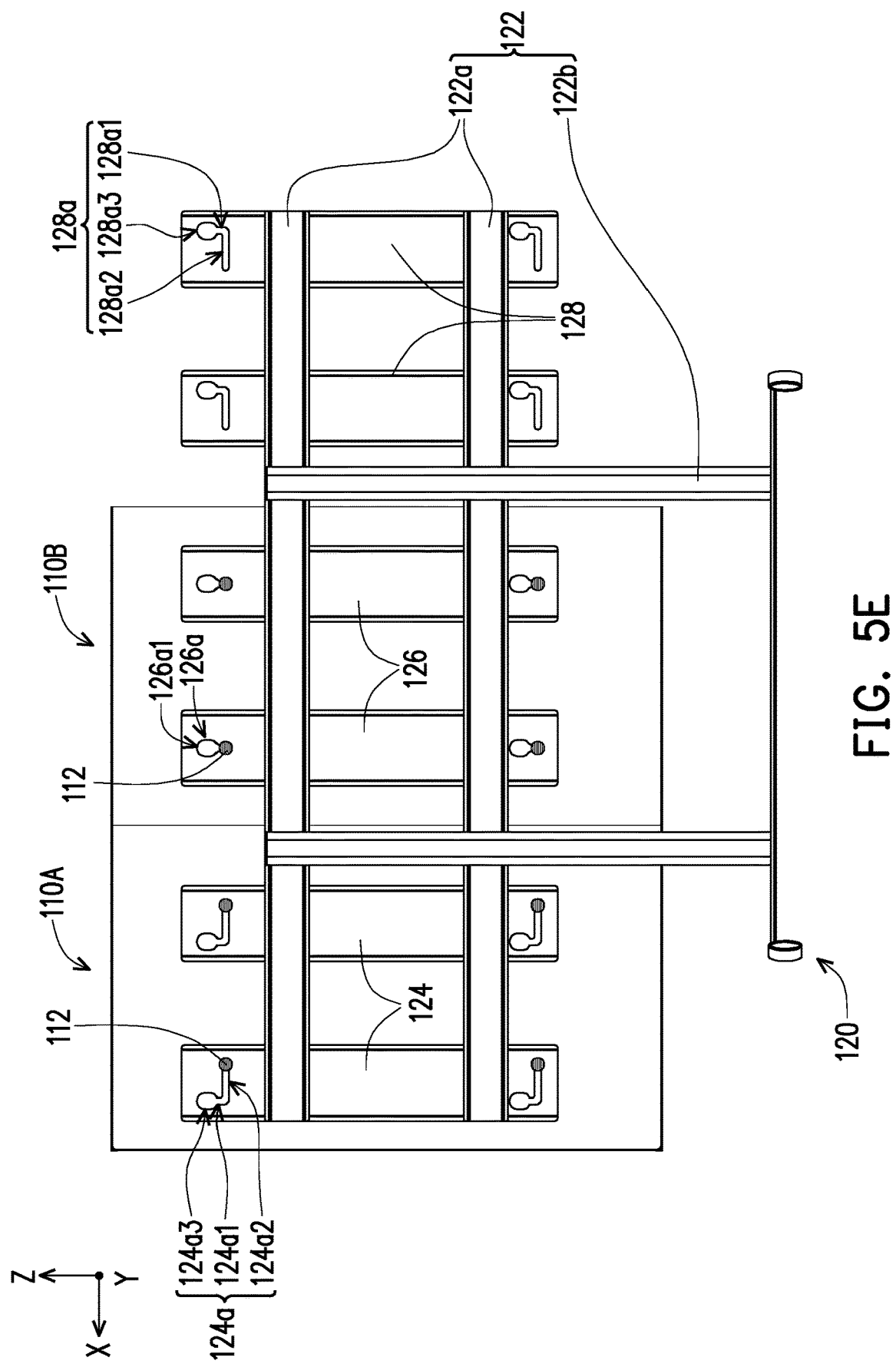

In the present embodiment, as shown in FIG. 5C, the rolling receiving portion 112 of the first display module 110A may enter the first hanging slot 124a through the first perforation 124a3 along the third direction Y, so that the rolling receiving portion 112 of the first display module 110A may reach a first position shown in FIG. 5D by guidance of the first guide section 124a1, and then reach a second position shown in FIG. 5E by guidance of the second guide section 124a2, thereby mounting the first display module 110A in place. In the present embodiment, since the first hanging slot 124a is an L-shaped slot and the second guide section 124a2 extends from one end of the first guide section 124a1 to the second hanging structure 126 in the second direction X, the second position is closer to the second hanging structure 126 than the first position. In other words, in the second direction X, the second position is located between the first position and the second hanging structure 126.

Figure 5F:
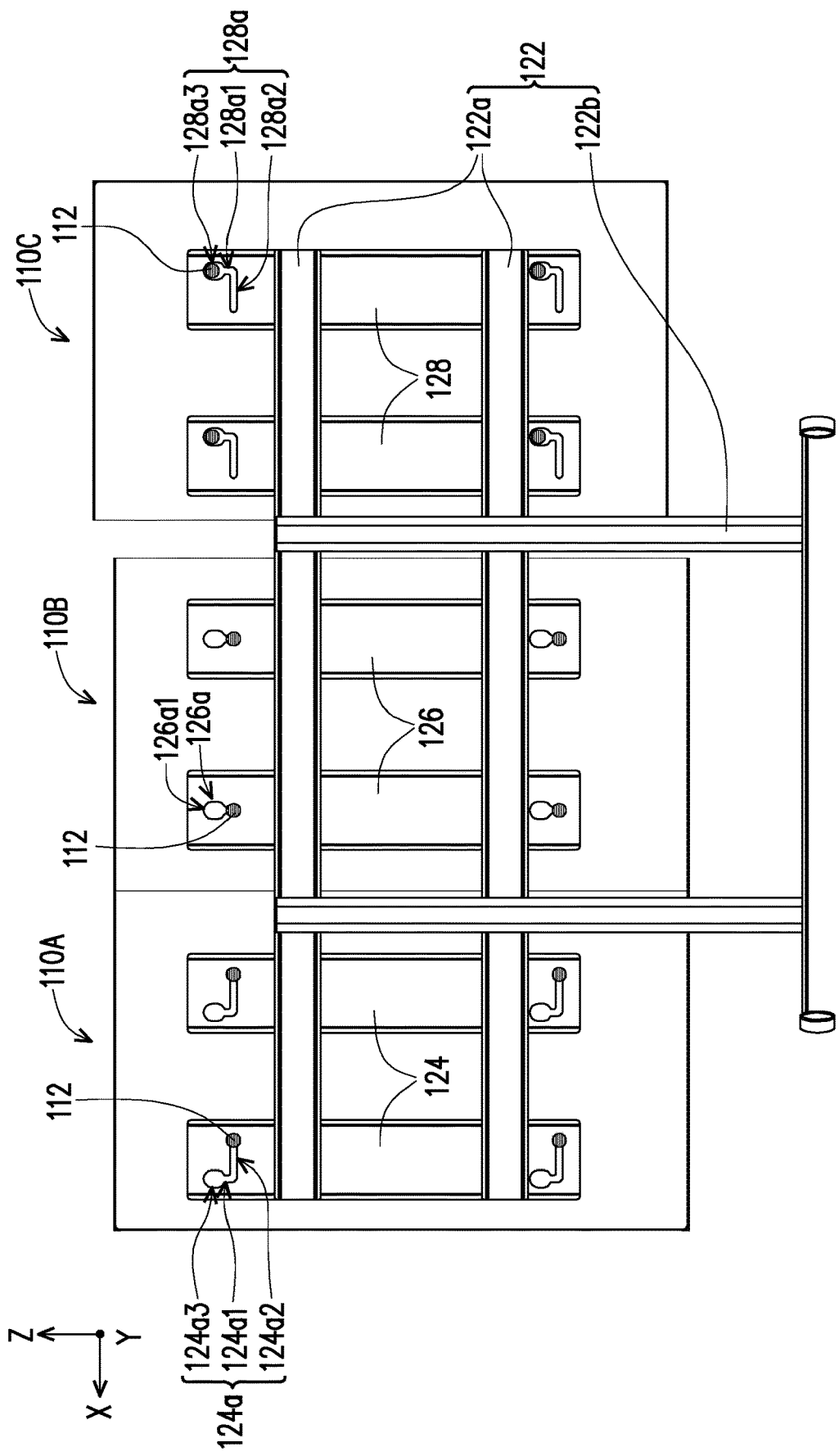
Figure 5G:
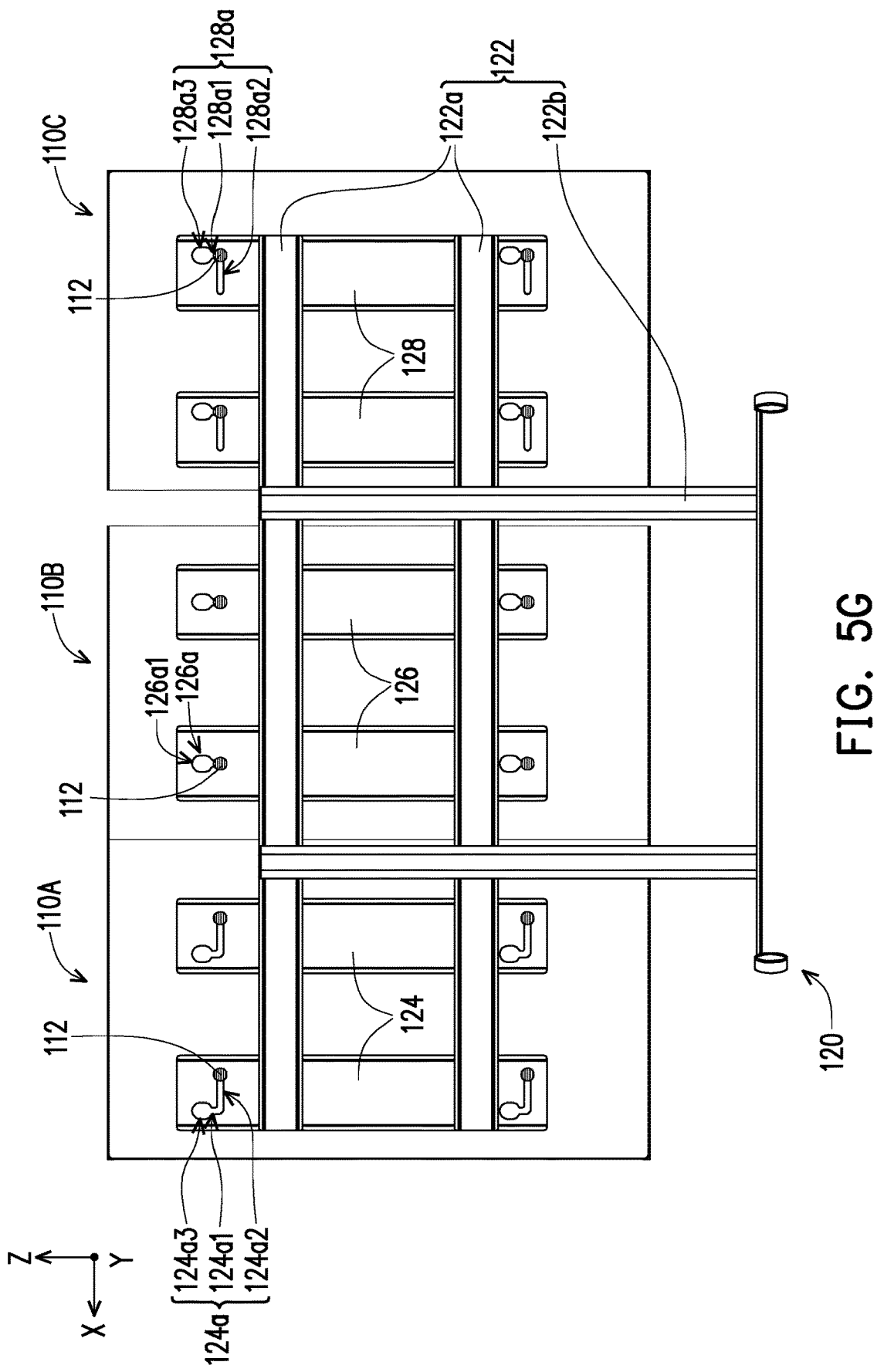
Figure 5H:
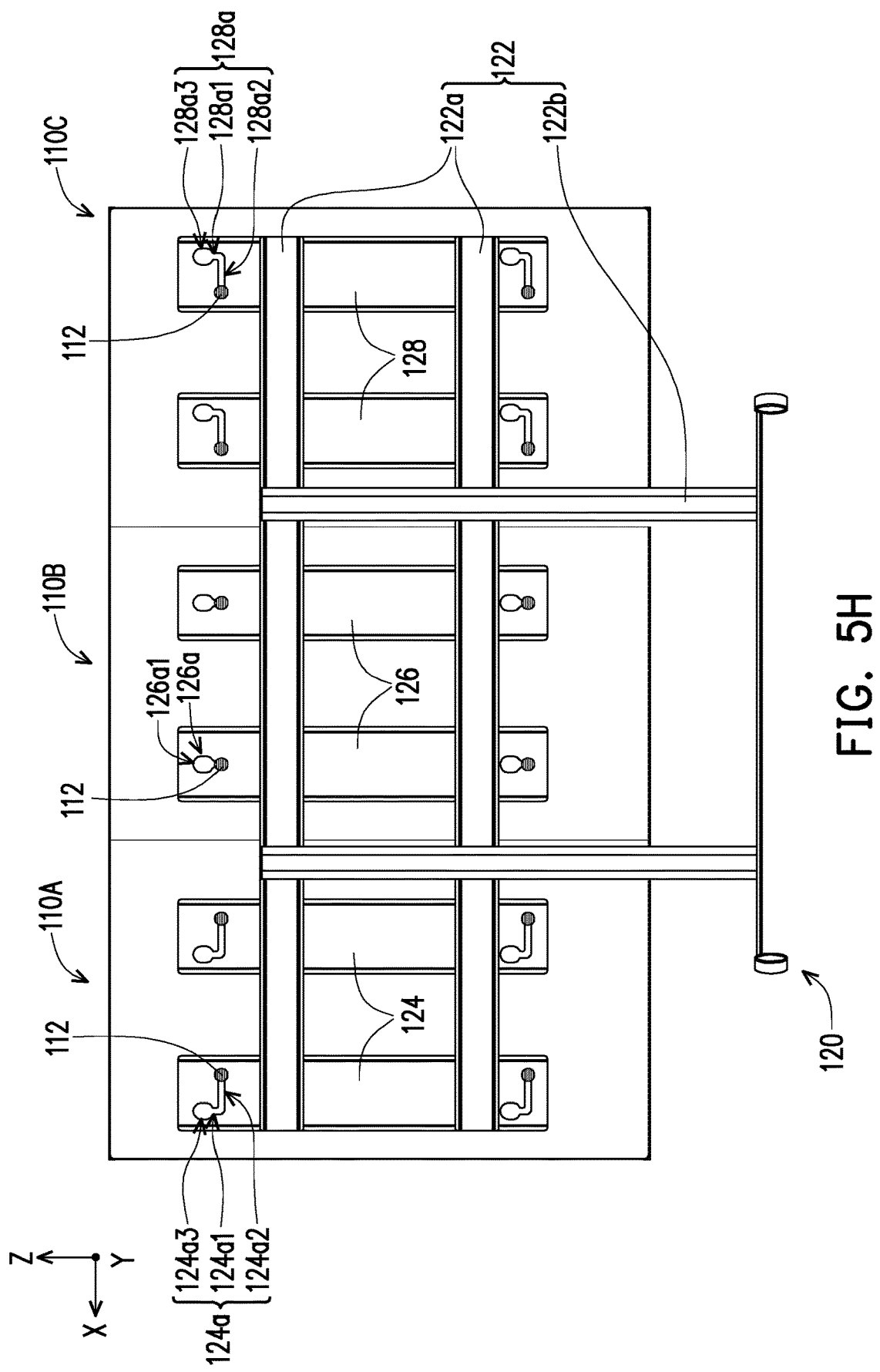

In the present embodiment, as shown in FIG. 5F, the rolling receiving portion 112 of the third display module 110C may enter the third hanging slot 128a through the third perforation 128a3 along the third direction Y, so that the rolling receiving portion 112 of the third display module 110C reaches a third position shown in FIG. 5G by guidance of the third guide section 128a1, and then reaches a fourth position shown in FIG. 5H by guidance of the fourth guide section 128a2, thereby mounting the third display module 110C in place. In the present embodiment, since the third hanging slot 128a has an inverse L-shape (relative to the L-shaped first hanging slot) and the fourth guide section 128a2 extends from the third guide section 128a1 to the first hanging structure 124 in the second direction X, the fourth position is closer to the first hanging structure 124 than the third position. In other words, in the second direction X, the fourth position is located between the third position and the first hanging structure 124.

In some embodiments, a connecting component may be disposed on at least one of the display modules 110A, 110B, and/or 110C to connect at least two adjacent display modules. For example, at least one connecting component 115 (two connecting components are shown) may be disposed on the first display module 110A or the second display module 110B. In this case, as shown in FIG. 3, when the first display module 110A is hung on the first hanging structure 124 and the second display module 110B is hung on the second hanging structure 126, the adjacent first display module 110A and second display module 110B may be connected through the connecting component 115 disposed between the first display module 110A and the second display module 110B. Further, at least one connecting component 117 (two connecting components are shown) may be disposed on the second display module 110B or the third display module 110C. In this further case, as shown in FIG. 3, when the second display module 110B is hung on the second hanging structure 126 and the third display module 110C is hung on the third hanging structure 128, the adjacent second display module 110B and third display module 110C may be connected through the connecting component 117 disposed between the second display module 110B and the third display module 110C.

Figure 6:
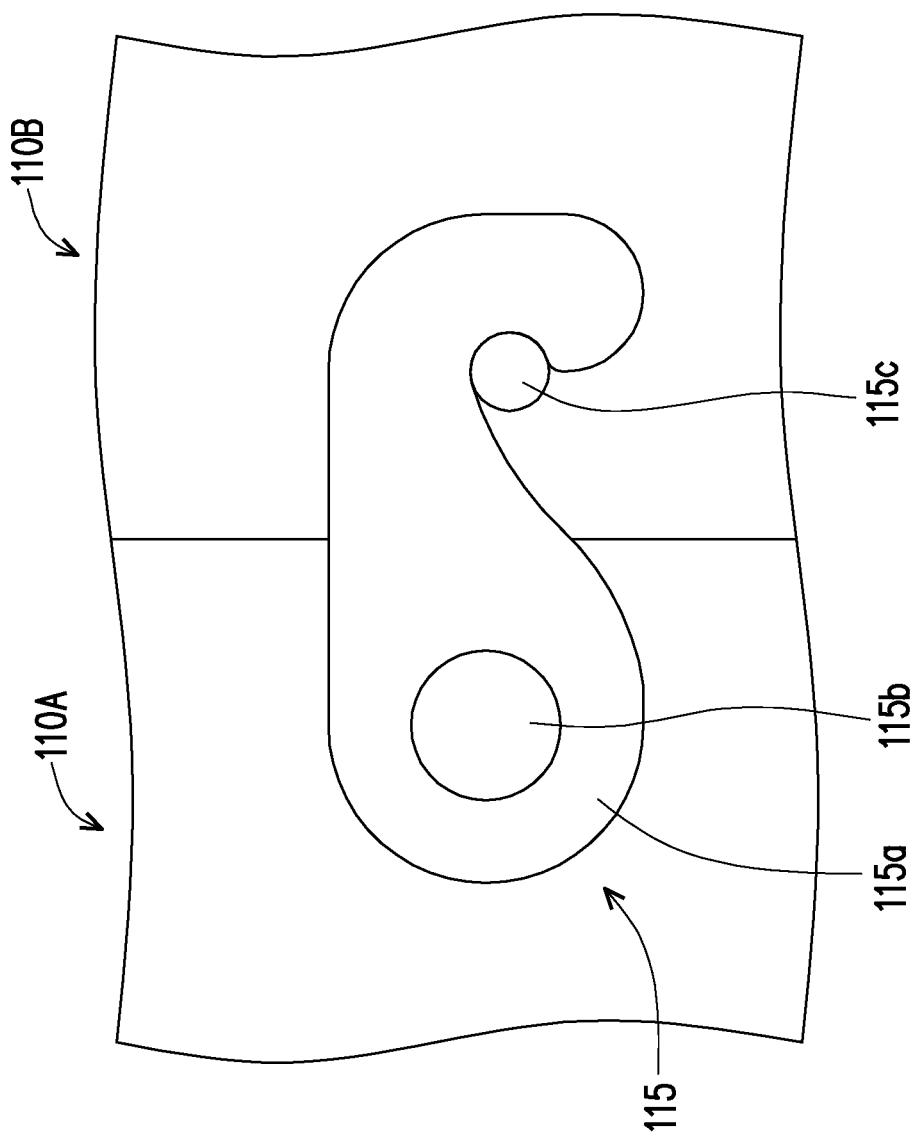
FIG. 6 schematically illustrates an exemplary specific structure of a connecting component in FIG. 3.

FIG. 6 schematically illustrates an exemplary specific structure of a connecting component in FIG. 3. For example, the connecting component 115 shown in FIG. 3 is, for example, an eccentric hook, and may include a hook 115a and a protruding post 115c. The hook 115a has a pivot 115b, and is rotatable about the pivot 115b. In the embodiment shown in FIG. 6, the pivot 115b is fixed to the first display module 110A, and the hook 115a is pivotally connected to the first display module 110A through the pivot 115. The protruding post 115c is fixed to the second display module 110B. In the present embodiment, the hook 115a is configured to rotate about the pivot 115b to be engaged with the protruding post 115c, thereby connecting the first display module 110A and the second display module 110B. Further, a configuration and a function of the connecting component 117 for assembling the second display module 110B and the third display module 110C are the same or similar to a configuration and a function of the connecting component 115, and the descriptions thereof are omitted herein.

Figure 7:
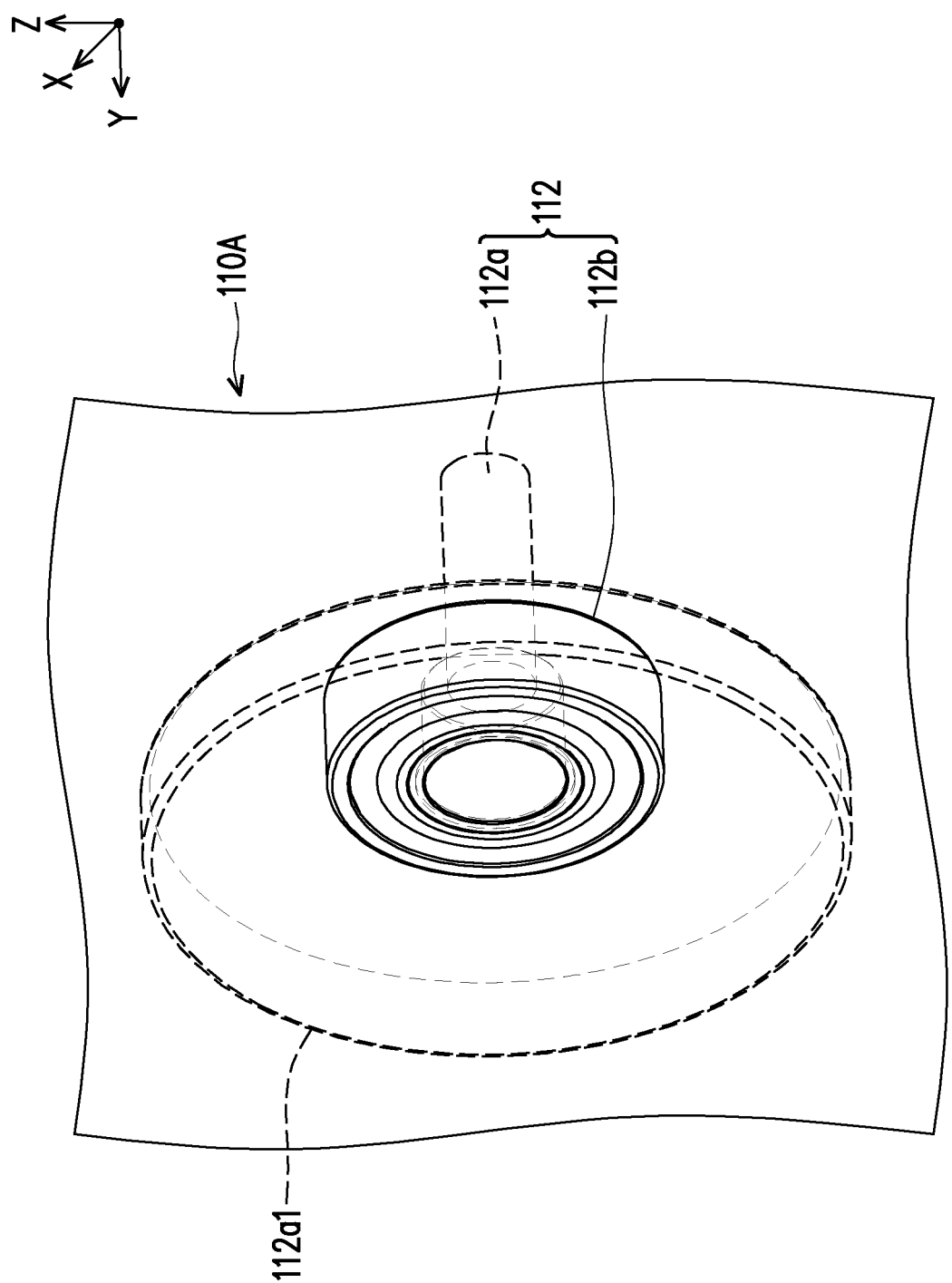
FIG. 7 is a schematic partial enlarged diagram of the display module in FIG. 1 at a rolling receiving portion.
Figure 8:
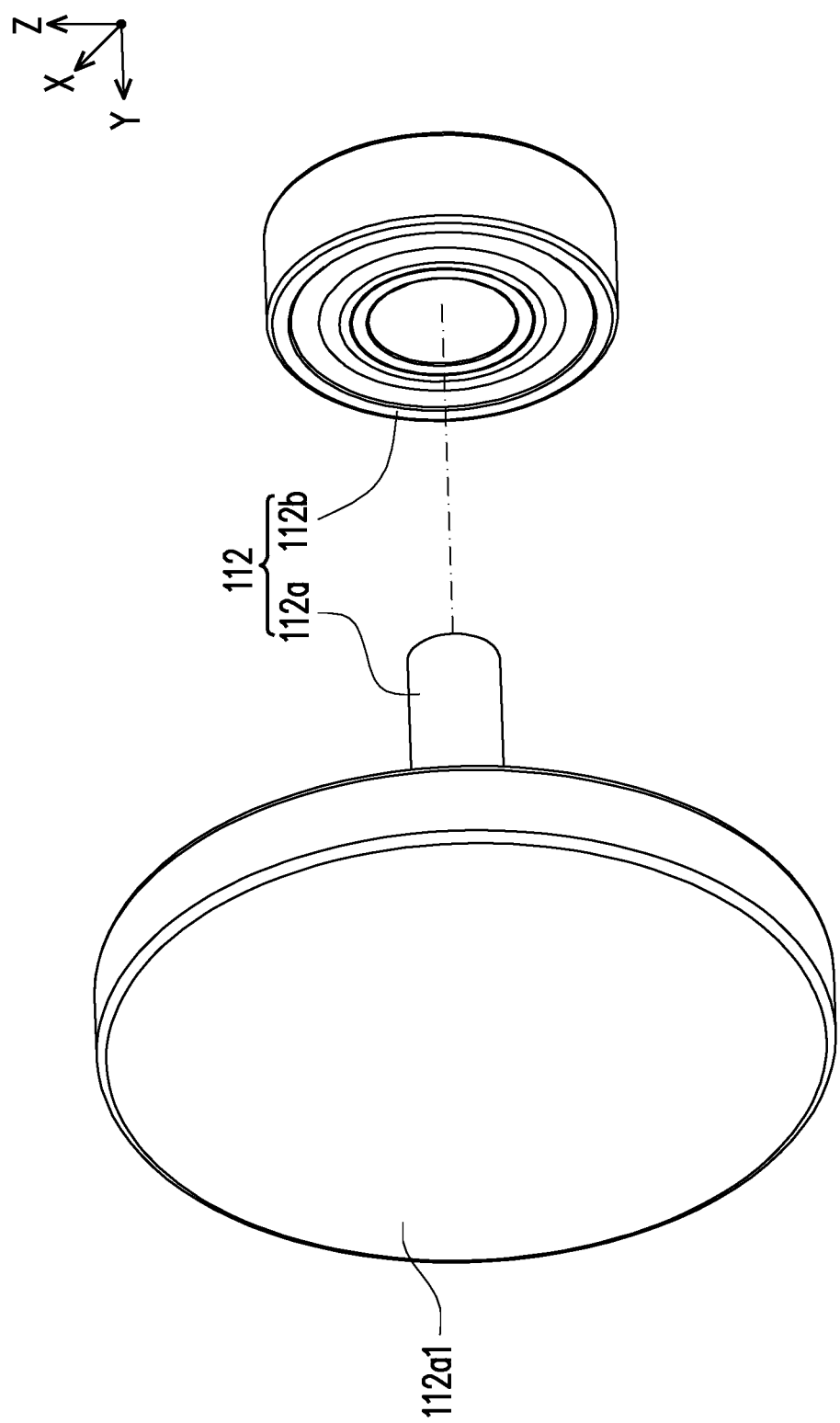
FIG. 8 is a schematic exploded diagram of the rolling receiving portion in FIG. 7.

FIG. 7 is a schematic partial enlarged diagram of the display module in FIG. 1 at a rolling receiving portion. FIG. 8 is a schematic exploded diagram of the rolling receiving portion in FIG. 7. Referring to FIG. 7 and FIG. 8, the rolling receiving portion 112 in the present embodiment includes a pillar 112a and a rolling portion 112b. The rolling portion 112b may be designed to surround the pillar 112a and be rotatable relative to the pillar 112a. The pillar 112a and the rolling portion 112b are configured to pass through the first hanging slot 124a (shown in FIG. 1), and the rolling portion 112b may, for example, roll along the first hanging slot 124a. For example, the rolling portion 112b is a ball bearing, and may drive the rolling receiving portion 112 of the first display module 110A, thereby driving the first display module 110A to smoothly move along the first hanging slot 124a. Further, the pillar 112a has a stop 112a1 at an end. The stop may be configured to prevent the first display module 110A from moving in the third direction Y, so that when the first display module 110A is hung on the first hanging structure 124 (shown in FIG. 1), the rolling receiving portion 112 is prevented from disengaging from the first hanging slot 124a, thereby preventing the first display module 110A from falling or shifting from the first hanging structure 124. In the embodiment shown in FIG. 8, the pillar 112a and the stop 112a1 may be, for example, an integrally formed screw. The rolling receiving portion 112 of other display modules, such as the second display module 110B and the third display module 110C, have a same or similar structure, and the descriptions thereof are omitted herein.

In addition, in a further embodiment, in addition to the connecting components 115 and/or 117, a connecting structure 114 (shown in FIG. 3) may be disposed on each display module. The connecting structure 114 includes, for example, a metal plate, and may be fixed to at least one of the display modules before assembly. For example, in the embodiments shown in FIG. 3 and FIG. 6, when the first display module 110A and the second display module 110B are moved and positioned, the hook 115a may be engaged with the protruding post 115c to connect the first display module 110A and the second display module 110B, and then the connecting structure 114 may be further screwed onto the first display module 110A and the second display module 110B to strengthen the connection. Further, a connecting structure 116 (shown in FIG. 3) for strengthening a connection between the second display module 110B and the third display module 110C may be the same as or similar to the connecting structure 114, and the descriptions thereof are omitted herein.

In some embodiments, a plurality of connecting structures or other structures may be disposed on a side of the cabinet 110b of each display module to be connected or fixed to other elements and structures of the display device. According to hanger, the display device, and the assembly manner in the embodiments (for example, the assembly manner in FIG. 5A to FIG. 5H) of the invention, the first display module 110A and/or the third display module 110C may be moved to be along the first direction Z (a vertical direction) to be aligned with the second display module 110B, and then moved toward the second display module 110B along the second direction X (a horizontal direction) to complete the assembly and positioning. Therefore, interference caused by the foregoing plurality of connecting structures or other structures during assembly of each display module can be avoided, thereby effectively reducing difficulty in assembling and positioning of the display module.

In other embodiments, the hanger 120 may include the first hanging structure 124 and the second hanging structure 126 but does not include the third hanging structure 128. Alternatively, the hanger 120 may include the third hanging structure 128 and the second hanging structure 126 but does not include the first hanging structure 124. Alternatively, the hanger 120 may include the first hanging structure 124 and the third hanging structure 128 but does not include the second hanging structure 126. No limitation is imposed on this in the invention. In the foregoing embodiments, there may be one or more first hanging structures 124, second hanging structures 126, and/or third hanging structures 128, and the number of the first hanging structures 124, the second hanging structures 126, and/or the third hanging structures 128 may be the same or different. No limitation is imposed on this in the invention.

Figure 9:
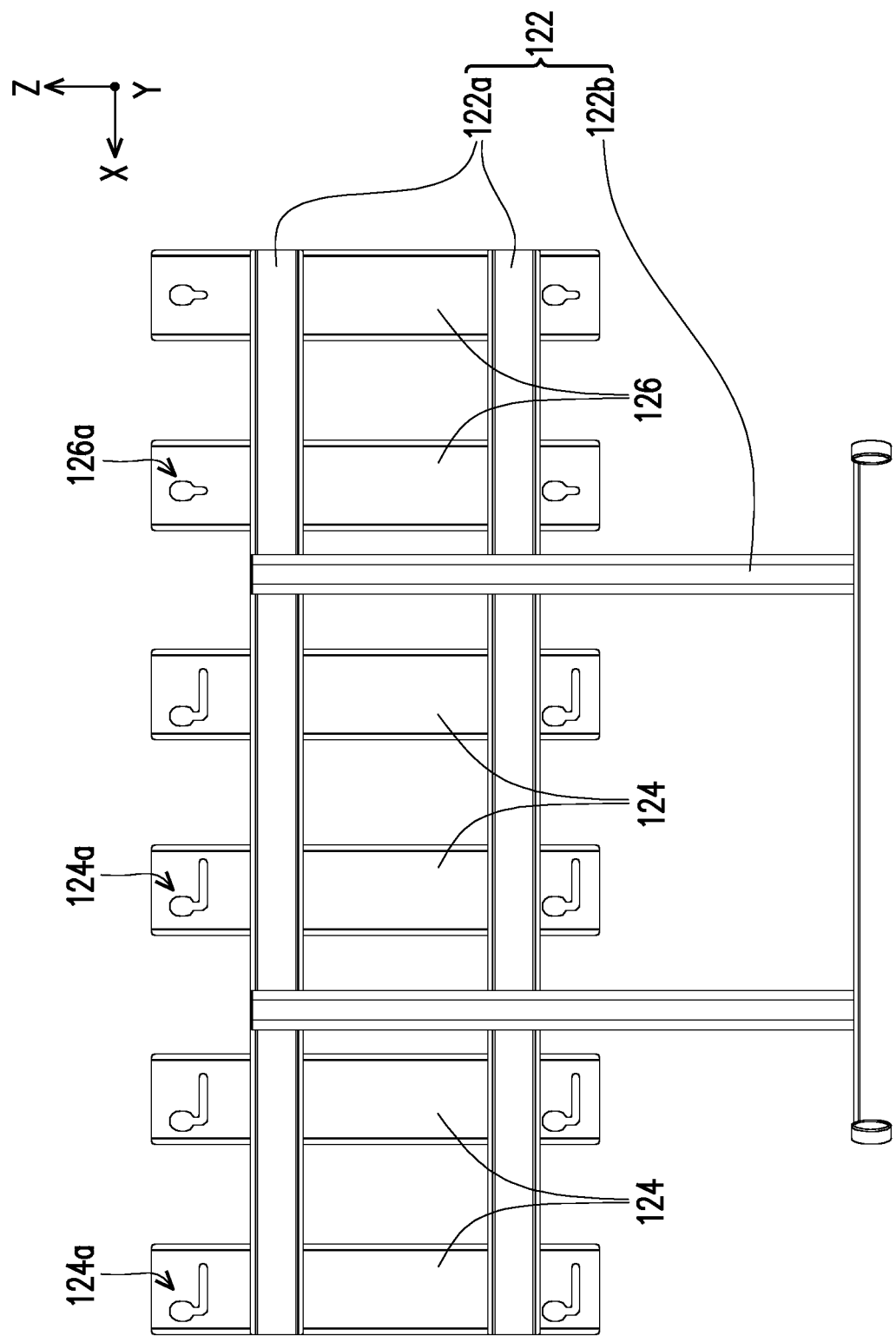
FIG. 9 is a schematic rear diagram of a hanger according to another embodiment of the invention.

For example, FIG. 9 is a schematic rear diagram of a hanger according to another embodiment of the invention. In a hanger 120A shown in FIG. 9, two sets of, that is, four first hanging structures 124 and one set, that is two second hanging structures 126 are disposed. One set of first hanging structures 124 are located between the other set of first hanging structures 124 and the second hanging structure 126.

Figure 10:
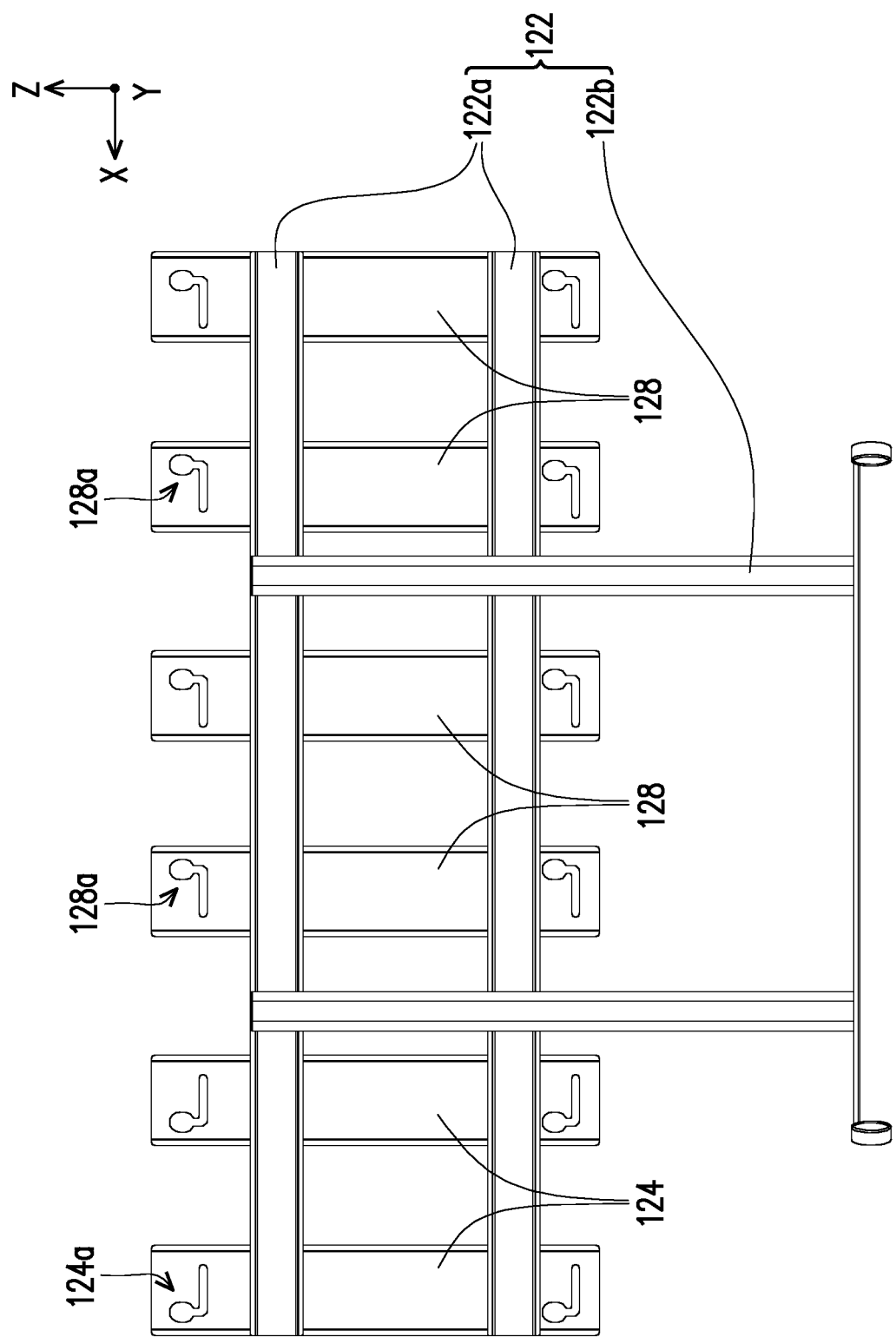
FIG. 10 is a schematic rear diagram of a hanger according to another embodiment of the invention.

For example, FIG. 10 is a schematic rear diagram of a hanger according to another embodiment of the invention. In a hanger 120B shown in FIG. 10, one set of, that is, two first hanging structures 124 and two sets of, that is, four third hanging structures 128 are disposed. One set of third hanging structures 128 are located between the other set of third hanging structures 128 and the first hanging structure 124.

Figure 11:
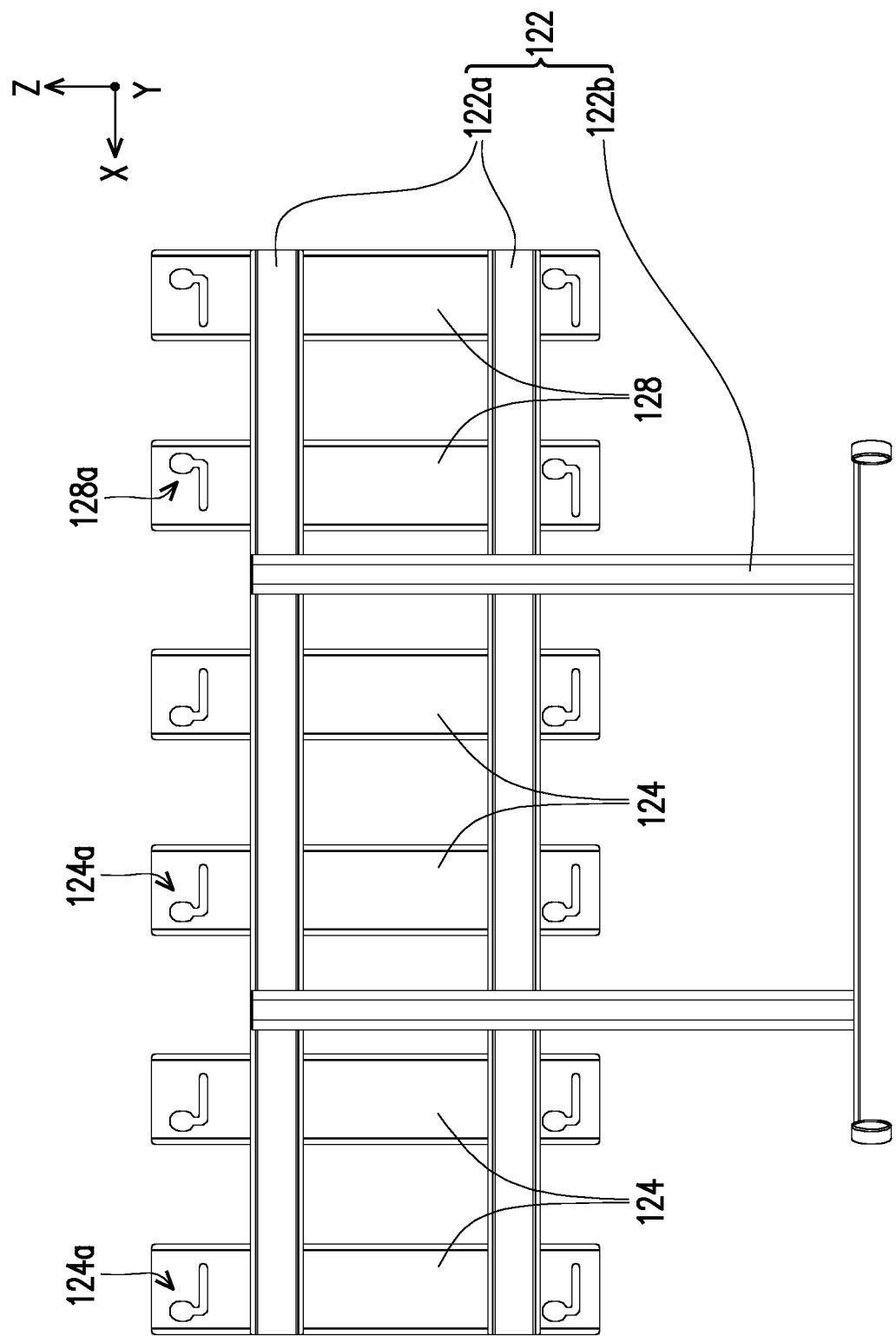
FIG. 11 is a schematic rear diagram of a hanger according to another embodiment of the invention.

FIG. 11 is a schematic rear diagram of a hanger according to another embodiment of the invention. In a hanger 120C shown in FIG. 11, two sets of, that is, four first hanging structures 124 and one set, that is, two third hanging structures 128 are disposed. One set of first hanging structures 124 are located between the other set of first hanging structures 124 and the third hanging structure 128.

In summary, the embodiments of the invention have at least one of the following advantages or effects. The first hanging structure of the hanger has a first hanging slot for the rolling receiving portion of the display module to pass through, and the first hanging slot includes the first guide section and the second guide section respectively extending along different directions. The rolling receiving portion of the display module may reach the first position by guidance of the first guide section, so that a cabinet of the display module is positioned at a predetermined mounting position in the first direction, and then the rolling receiving portion of the display module may reach the second position by guidance of the second guide section, so that the cabinet of the display module is moved to a predetermined mounting position in the second direction to complete mounting of the display module. In such a configuration, by guidance of the first guide section and the second guide section of the first hanging slot to the rolling receiving portion of the display module, the cabinet of the display module can be smoothly and easily moved to a correct position, thereby effectively reducing difficulty in assembling and positioning the display module.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A hanger configured to hang a plurality of display modules, each of the plurality of display modules having at least one rolling receiving portion, wherein the hanger comprises a hanger base, a first hanging structure and a second hanging structure, wherein
   the first hanging structure is disposed on the hanger base, wherein
   the first hanging structure has at least one first hanging slot and the at least one first hanging slot corresponds to the at least one rolling receiving portion of the display module, so that at least one rolling receiving portion of a first display module passes through the at least one first hanging slot to hang the first display module on the first hanging structure, wherein
   the at least one first hanging slot comprises a first guide section extending along a first direction and a second guide section extending along a second direction, and the second guide section is connected to the first guide section, wherein
   the at least one rolling receiving portion of the first display module reaches a first position by guidance of the first guide section and reaches a second position by guidance of the second guide section,
   wherein the second hanging structure is disposed on the hanger base and is parallel to the first hanging structure, the first hanging structure and the second hanging structure are arranged at intervals in the second direction, and
   the second hanging structure has at least one second hanging slot extending along the first direction, so that at least one rolling receiving portion of a second display module passes through the at least one second hanging slot to hang the second display module on the second hanging structure, wherein the second position is closer to the second hanging structure than the first position.

2. The hanger according to claim 1, wherein the second direction is perpendicular to the first direction.

3. The hanger according to claim 1, wherein
   the at least one first hanging slot further comprises a first perforation located at one end of the first guide section, wherein a diameter of the first perforation is greater than a width of the first guide section and a diameter of the at least one rolling receiving portion, and
   the second guide section is connected to another end of the first guide section, and the at least one rolling receiving portion of the first display module is configured to enter the at least one first hanging slot from the first perforation.

4. The hanger according to claim 1, wherein
   the at least one second hanging slot further comprises a second perforation located at one end of the at least one second hanging slot, and a diameter of the second perforation is greater than a width of the at least one second hanging slot and a diameter of the at least one rolling receiving portion, wherein
   the at least one rolling receiving portion of the second display module is configured to enter the at least one second hanging slot through the second perforation.

5. The hanger according to claim 1, further comprising:
   a third hanging structure disposed on the hanger base and parallel to the first hanging structure, wherein
   the third hanging structure has at least one third hanging slot, so that at least one rolling receiving portion of a third display module passes through the at least one third hanging slot to hang the third display module on the third hanging structure, wherein
   the at least one third hanging slot comprises a third guide section extending along the first direction and a fourth guide section extending along the second direction, and the fourth guide section is connected to the third guide section, wherein
   the at least one rolling receiving portion of the third display module reaches a third position by guidance of the third guide section and reaches a fourth position by guidance of the fourth guide section, wherein the fourth position is closer to the first hanging structure than the third position.

6. The hanger according to claim 5, wherein the at least one third hanging slot further comprises a third perforation located at one end of the third guide section, and a diameter of the third perforation is greater than a width of the third guide section and a diameter of the at least one rolling receiving portion, wherein the fourth guide section is connected to another end of the third guide section, and the at least one rolling receiving portion of the third display module is configured to enter the at least one third hanging slot through the third perforation.

7. The hanger according to claim 5, wherein the first hanging structure, the second hanging structure, and the third hanging structure are arranged at intervals in the second direction.

8. The hanger according to claim 5, wherein the hanger comprises a set of the first hanging structures comprising two of the first hanging structures, wherein the hanger comprises a set of the second hanging structures comprising two of the second hanging structures, wherein the hanger comprises a set of the third hanging structures comprising two of the third hanging structures.

9. The hanger according to claim 5, wherein a number of the at least one first hanging slot, the at least one second hanging slot, and/or the at least one third hanging slot is multiple, wherein the at least one first hanging slot, the at least one second hanging slot, and the at least one third hanging slot are respectively linearly arranged at intervals along the first direction on the first hanging structure, the second hanging structure, and the third hanging structure.

10. The hanger according to claim 5, wherein when the first display module is hung on the first hanging structure, the second display module is hung on the second hanging structure, and the third display module is hung on the third hanging structure, the first display module, the second display module, and the third display module are connected together by at least one connecting component disposed between the first display module and the second display module and at least one connecting component disposed between the second display module and the third display module.

11. The hanger according to claim 1, wherein when the first display module is hung on the first hanging structure and the second display module is hung on the second hanging structure, the first display module and the second display module are connected together through at least one connecting component disposed between the first display module and the second display module.

12. The hanger according to claim 1, further comprises another first hanging structure, and the first hanging structure located between the another first hanging structure and the second hanging structure, wherein the first hanging structure, the another first hanging structure and the second hanging structure are arranged at intervals in the second direction.

13. A hanger configured to hang a plurality of display modules, each of the plurality of display modules having at least one rolling receiving portion, wherein the hanger comprises a hanger base, a first hanging structure and a hanging structure, wherein the first hanging structure is disposed on the hanger base, wherein the first hanging structure has at least one first hanging slot and the at least one first hanging slot corresponds to the at least one rolling receiving portion of the display module, so that at least one rolling receiving portion of a first display module passes through the at least one first hanging slot to hang the first display module on the first hanging structure, wherein the at least one first hanging slot comprises a first guide section extending along a first direction and a second guide section extending along a second direction, and the second guide section is connected to the first guide section, wherein the at least one rolling receiving portion of the first display module reaches a first position by guidance of the first guide section and reaches a second position by guidance of the second guide section, wherein the hanging structure is disposed on the hanger base and is parallel to the first hanging structure, wherein the first hanging structure and the hanging structure are arranged at intervals in the second direction, and the hanging structure has at least one hanging slot, so that at least one rolling receiving portion of another display module passes through the at least one hanging slot to hang the another display module on the hanging structure, wherein the at least one hanging slot comprises a third guide section extending along the first direction and a fourth guide section extending along the second direction, and the fourth guide section is connected to the third guide section, wherein the at least one rolling receiving portion of the another display module reaches a third position by guidance of the third guide section and reaches a fourth position by guidance of the fourth guide section, wherein the fourth position is closer to the first hanging structure than the third position.

14. The hanger according to claim 13, wherein when the first display module is hung on the first hanging structure and the another display module is hung on the hanging structure, the first display module and the another display module are connected together by at least one connecting component disposed between the first display module and the another display module.

15. The hanger according to claim 13, further comprises another hanging structure, and the hanging structure located between the first hanging structure and the another hanging structure, wherein the first hanging structure, the hanging structure and the another hanging structure are arranged at intervals in the second direction, or further comprises another first hanging structure, and the first hanging structure located between the hanging structure and the another first hanging structure, wherein the first hanging structure, the another first hanging structure and the hanging structure are arranged at intervals in the second direction.

16. A display device, comprising a plurality of display modules and a hanger, wherein each of the plurality of display modules has at least one rolling receiving portion; and the hanger comprises a hanger base, a first hanging structure and a second hanging structure, wherein the first hanging structure is disposed on the hanger base, wherein the first hanging structure has at least one first hanging slot corresponding to the at least one rolling receiving portion of the display module, so that at least one rolling receiving portion of a first display module passes through the at least one first hanging slot to hang the first display module on the first hanging structure, wherein the at least one first hanging slot comprises a first guide section extending along a first direction and a second guide section extending along a second direction, and the second guide section is connected to the first guide section, wherein the at least one rolling receiving portion of the first display module reaches a first position by guidance of the first guide section and reaches a second position by guidance of the second guide section, wherein the second hanging structure is disposed on the hanger base and is parallel to the first hanging structure, and the first hanging structure and the second hanging structure are arranged at intervals in the second direction, the second hanging structure has at least one second hanging slot extending along the first direction, so that at least one rolling receiving portion of a second display module passes through the at least one second hanging slot to hang the second display module on the second hanging structure, wherein the second position is closer to the second hanging structure than the first position.

17. The display device according to claim 16, wherein the second direction is perpendicular to the first direction.

18. The display device according to claim 16, wherein each of the plurality of display modules comprises at least one connecting component, wherein when each of the plurality of display modules is hung on the hanger, the at least one connecting component is configured to connect adjacent display modules together.

19. The display device according to claim 16, wherein the at least one rolling receiving portion comprises a pillar and a rolling portion, wherein the rolling portion is rotatably disposed to surround the pillar, the pillar and the rolling portion pass through the at least one first hanging slot, and the rolling portion rolls along the at least one first hanging slot.

20. The display device according to claim 19, wherein the rolling portion is a ball bearing.

21. The display device according to claim 16, wherein the hanger further comprises:

a third hanging structure disposed on the hanger base and parallel to the first hanging structure, wherein the first hanging structure and the third hanging structure are arranged at intervals in the second direction, and the third hanging structure has at least one third hanging slot, so that at least one rolling receiving portion of a third display module passes through the at least one third hanging slot to hang the third display module on the third hanging structure, wherein the at least one third hanging slot comprises a third guide section extending along the first direction and a fourth guide section extending along the second direction, and the fourth guide section is connected to the third guide section, wherein the at least one rolling receiving portion of the third display module reaches a third position by guidance of the third guide section and reaches a fourth position by guidance of the fourth guide section, wherein the fourth position is closer to the first hanging structure than the third position.

22. The display device according to claim 21, wherein the first hanging structure, the second hanging structure, and the third hanging structure are arranged at intervals in the second direction.

* * * * *